(12) United States Patent
Fritsch

(10) Patent No.: US 6,945,194 B2
(45) Date of Patent: Sep. 20, 2005

(54) BOX STALL FOR FARM ANIMALS

(76) Inventor: Ronald M. Fritsch, 6229 Highway 57, DePere, WI (US) 54115

( * ) Notice: Subject to any disclaimer, the term of this patent is extended or adjusted under 35 U.S.C. 154(b) by 63 days.

(21) Appl. No.: 10/714,714

(22) Filed: Nov. 17, 2003

(65) Prior Publication Data

US 2005/0115512 A1 Jun. 2, 2005

(51) Int. Cl.7 ............................. A01K 5/00; A01K 1/03
(52) U.S. Cl. ....................................... 119/454; 119/473
(58) Field of Search ................................ 119/454, 453, 119/472, 473, 475, 519, 521, 61.4, 61.57; 220/4.01, 4.33, 4.34

(56) References Cited

U.S. PATENT DOCUMENTS

| 988,715 | A | * | 4/1911 | Jaeger | 119/61.4 |
|---|---|---|---|---|---|
| 1,224,234 | A | * | 5/1917 | Taber | 220/4.28 |
| 2,033,767 | A | * | 3/1936 | Hammer | 220/4.33 |
| 2,652,025 | A | | 9/1953 | Beatty | |
| 3,160,140 | A | * | 12/1964 | Porter | 119/475 |
| 3,541,994 | A | | 11/1970 | Meng | |
| 3,580,411 | A | * | 5/1971 | Mills | 220/4.01 |
| 3,857,540 | A | * | 12/1974 | Ecker | 220/4.33 |
| 3,858,555 | A | | 1/1975 | Smith | |
| 4,202,292 | A | | 5/1980 | Strickland | |
| 4,478,175 | A | * | 10/1984 | Fisher et al. | 119/448 |
| 4,508,060 | A | | 4/1985 | Schulte | |
| 4,590,886 | A | | 5/1986 | Brashear | |
| 4,781,149 | A | | 11/1988 | Hinnenkamp | |
| 5,144,912 | A | * | 9/1992 | Hammett et al. | 119/61.57 |
| 5,497,729 | A | | 3/1996 | Lord | |
| 6,167,842 | B1 | | 1/2001 | Akins et al. | |

* cited by examiner

Primary Examiner—Teri Pham Luu
Assistant Examiner—Elizabeth Shaw
(74) Attorney, Agent, or Firm—Thomas J. Nikolai; Nikolai & Mersereau, P.A.

(57) ABSTRACT

An animal holding pen comprises front, rear, left and right rigid plastic panels that interlock to one another by means of a coupling system including stainless steel fasteners that remain physically attached to the side panel assemblies when the front and rear panels are detached. The front panel may include an opening through which the animal may extend its head when feeding. Feed and water are adapted to be contained in pails held by a pail support assembly that can be folded up against the front panel or deployed perpendicular to the front panel.

10 Claims, 4 Drawing Sheets

BOX STALL FOR FARM ANIMALS

BACKGROUND OF THE INVENTION

I. Field of the Invention

This invention relates generally to animal confinement pens, and more particularly to a modular pen especially adapted for holding newly borne calves for a time sufficient to wean the animal of its suckling instinct.

II. Discussion of the Prior Art

On dairy farms, when new calves are born, they are separated from the mother shortly after birth for several weeks until they lose the suckling and nursing instinct. The calf, when confined, must be fed and maintained in a clean environment.

Many forms of confinement pens are known in the art. The Schulte U.S. Pat. No. 4,508,060 describes a confinement pen and shelter for outdoor use that is fabricated from lumber and is intended to be a permanent structure. Multiple enclosures are mounted on a set of skids and a false floor is slotted to permit manure to drop through. After a predetermined period of use, the entire structure may be dragged by a tractor to a new location, leaving the manure behind for pick up by a front end loader or the like. The animal enclosure described in the Schulte patent would be impractical for use in a dairy barn in that it would take up valuable space even when not in use.

Thus, it is a desirable feature of a box stall for calves or other domestic farm animals that it be easy to set up and knock down and easily stored in its knocked-down condition occupying a minimum of space.

The Meng U.S. Pat. No. 3,541,994 describes a calf stall having a base that is elevated from the ground and formed from steel tubes defining legs into which vertical posts may be inserted. The upper ends of the vertical posts are connected by tie rods and provision is made for mounting plywood wall members along opposed side edges. The floor of the stall comprises a grate that allows manure to pass through it. The base members are designed so that a plurality of stalls may be assembled in side-by-side relation. In that the stall in the Ming '994 patent does not have a rear panel, the animal must be tethered. Rather than having a front panel, a series of rods are welded to a frame where the spacing is such that the animal's head may protrude between the spaced bars. A pail holder is welded to the spaced bars for feeding purposes.

While the Meng '994 patent is designed for in-barn use, it is relatively difficult to assemble and knock down. Also, given the shape of the several parts, it cannot be stored flat.

Yet another prior art calf containment pen is disclosed in the Smith U.S. Pat. No. 3,858,555. It comprises a pen structure composed of at least two pen sections with front and rear walls formed of panels that are removably mounted for set up and knock down. The front and rear walls are pivotally connected to the floor structure of expanded metal, allowing the front and rear walls to collapse against the floor when the sidewalls have been removed. The stalls are designed to be mounted on skids that bolt to the sides of the pen sections. To completely set up and knock down the assembly, it is necessary to insert and tighten or remove and store 26 bolts. This can be quite time consuming and the parts may be lost or misplaced.

A need, therefore, exists for a calf holding pen or box stall that is simple and quick to assemble and disassemble without the use of tools of any type and having no nuts, bolts, snaps, etc. to lose and that are fabricated entirely of materials that can be readily cleaned with a pressure washer following use and that are stacked flat for ease of storage. It is the principal object of the present invention to provide such a box stall.

SUMMARY OF THE INVENTION

The invention accomplishes these objects and advantages by providing in one aspect a calf holding pen comprising a front panel, a rear panel, and left and right side panels, each of the panels being generally rectangular and fabricated from a smooth polymeric material, such that dirt, manure and the like can be readily washed off. The side panels each include a reinforcing strut affixed thereto at opposed vertical edges thereof. The front and rear panels each include first and second elongated, narrow apertures formed therethrough at vertically spaced locations adjacent opposed vertical edges thereof. A pair of fasteners is affixed to the reinforcing struts of the side panels at vertically spaced locations corresponding to the spacing between the first and second elongated apertures. The fasteners are adapted to fit through the elongated apertures when the fasteners are disposed in a first orientation but not when the fasteners are disposed in a second orientation. The front panel has an opening sufficiently large to permit a calf's head to pass therethrough and affixed to the front panel at a location immediately below the opening is a food pail holder that comprises a platform having at least one hole formed through it in which a food pail can be inserted and retained. The platform is preferably pivotally joined to the front panel to be movable from a position parallel to the front panel to a position perpendicular to the front panel.

The confinement pen of the present invention can be erected by simply passing the fasteners on the side panels through the apertures on the front and rear panels and then turning the fastener 90° to thereby lock the four panels together. There are no parts to loose and when the panels are detached from one another, they can be stored flat in a minimum of space. Being easy and quick to tear down, a farmer, using a skid loader can move the stalls from the barn, wash the panels, clean out the buildup of manure and bedding from the barn and then haul the stalls back into the barn and reassemble them.

DESCRIPTION OF THE PREFERRED EMBODIMENT

Figure 1:
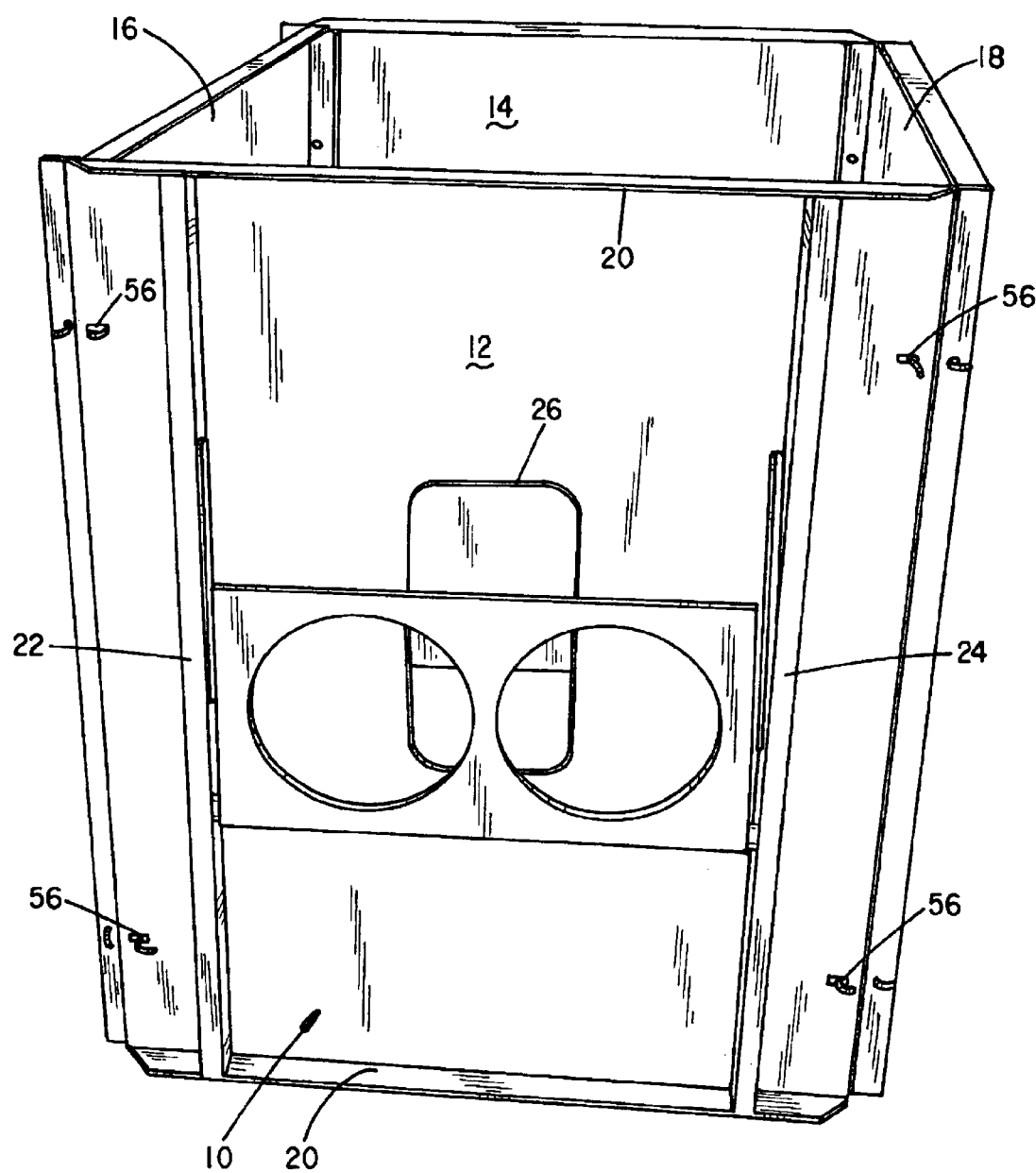
FIG. 1 is a front isometric view of the calf holding pen comprising a preferred embodiment of the present invention.

Certain terminology will be used in the following description for convenience in reference only and will not be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof. Said terminology will include the words above specifically mentioned, derivatives thereof and words of similar import.

In FIG. 1, there is shown a frontal perspective view of one section of an animal holding pen constructed in accordance with the present invention. The animal holding pen is indicated generally by numeral 10 and is seen to comprise a generally rectangular enclosure defined by a front panel 12, a rear panel 14, a left side panel 16 and a right side panel 18 that are joined together in a manner yet to be more fully described.

The panels are preferably formed in a vacuum molding operation from either virgin or recycled polyethylene plastic, although those skilled in the art will appreciate that other polymers or polymer blends may be used just as well. Because of the molding technique employed, the inner and outer surfaces of each of the panels are quite smooth, making them easy to clean using a power washer.

The panels may be about ¼ in. in thickness and to provide increased rigidity, integrally formed outwardly extending flanges may be formed along only the top and bottom edges of each of the panels or about all four edges. If thicker panels are used, say ¾" poly, the flanges can be eliminated. It is also contemplated that a hollow poly comprising thin outer sheets sandwiching a honeycomb structure can also be used.

Affixed to the outer surface of the front panel 12 are parallel, spaced-apart, vertically extending ribs 22 and 24 that are also preferably formed from polyethylene plastic. Centrally located between the ribs 22 and 24 is a rectangular opening 26 which allows a calf, lamb or other farm animal to extend its head through the opening to reach food and water contained in pails (not shown) held in a pail holder assembly 28 located immediately below the opening 26. As can be observed from FIGS. 1 and 2, the pail holder 28 comprises a platform 30 formed from polyethylene having one or more circular openings 32 formed therethrough. The platform is pivotally mounted between the parallel vertical ribs 22 and 24 by a pin 33 that extends through the vertical rib 22 and annular spacer 34 the length dimension of the platform 28, a further spacer 36, and through the vertical rib 24. Thus, the platform 30 can swing from a position parallel to the front panel 12 (as shown in FIG. 1) to a position extending perpendicularly to the front panel 12. Rigid plastic arms 38 and 40 are pivotally joined at an upper end thereof to the respective ribs 22 and 24. The arms 38 and 40 include a longitudinal slot, as at 42, and a pin 43 extends through the slot and into the platform 28 so that the platform 28 can only drop down to a horizontal disposition when being used to support feed and water pails.

Figure 3:
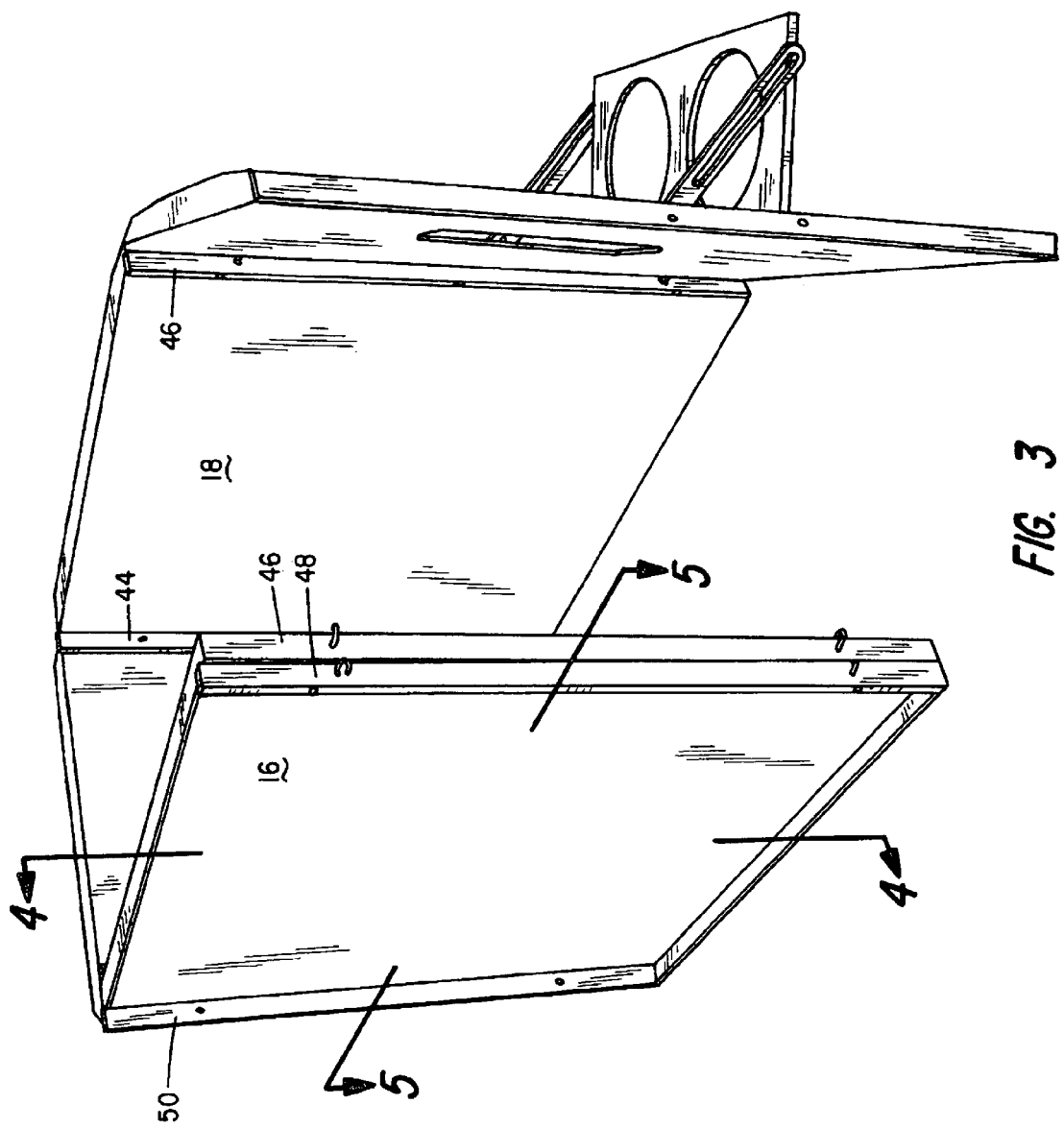
FIG. 3 is an isometric view showing the front panel detached from a left side panel and swung to an open position, allowing entry or exit of a calf or a person attending to the calf.
Figure 4:
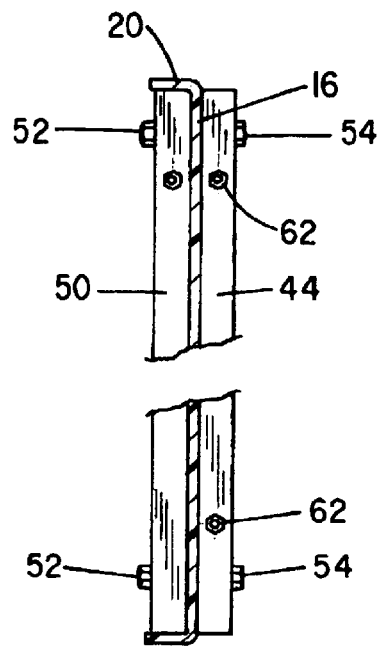
FIG. 4 is a vertical cross-sectional view taken along the lines 4—4 in FIG. 3.
Figure 5:
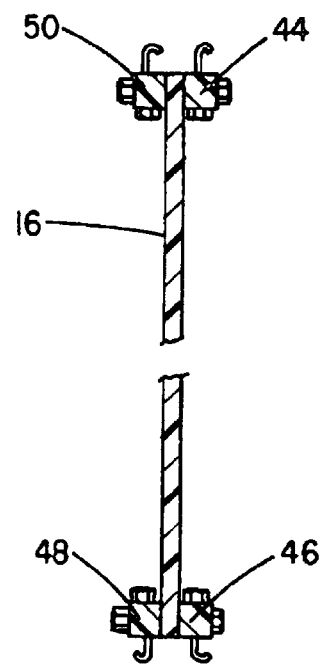
FIG. 5 is a horizontal cross-sectional view of the side panel taken along the line 5—5 in FIG. 3.

Referring to FIGS. 3 and 4, it can be seen that each of the side panels 16 and 18 includes a vertically extending reinforcing strut, as at 44 and 46, bolted to the inside surface thereof and another pair of vertical struts, as at 48 and 50, affixed to the outer surface of the respective panel 16 or 18. While the vertical struts 46–48 and 44–50 may sandwich the respective panels 16 or 18 and fasten with a bolt 52 and a nut 54, it is also possible to secure the vertical struts in place using a suitable plastic bonding agent compatible with the polymer used in fabricating the panels. If a rotor-molding technique is employed to fabricate the panels, the reinforcing struts can be integrally molded.

The front and rear panels 12 and 14 are secured to the left and right panels 16 and 18 in a way that does not require removal of any parts once the fastening members have been affixed to the side panel assemblies, presumably at the factory. Thus, farm personnel do not have to screw and unscrew a number of bolts in order to effect assembly and disassembly. The manner in which the panels are fastened to one another will now be explained.

Figure 2:
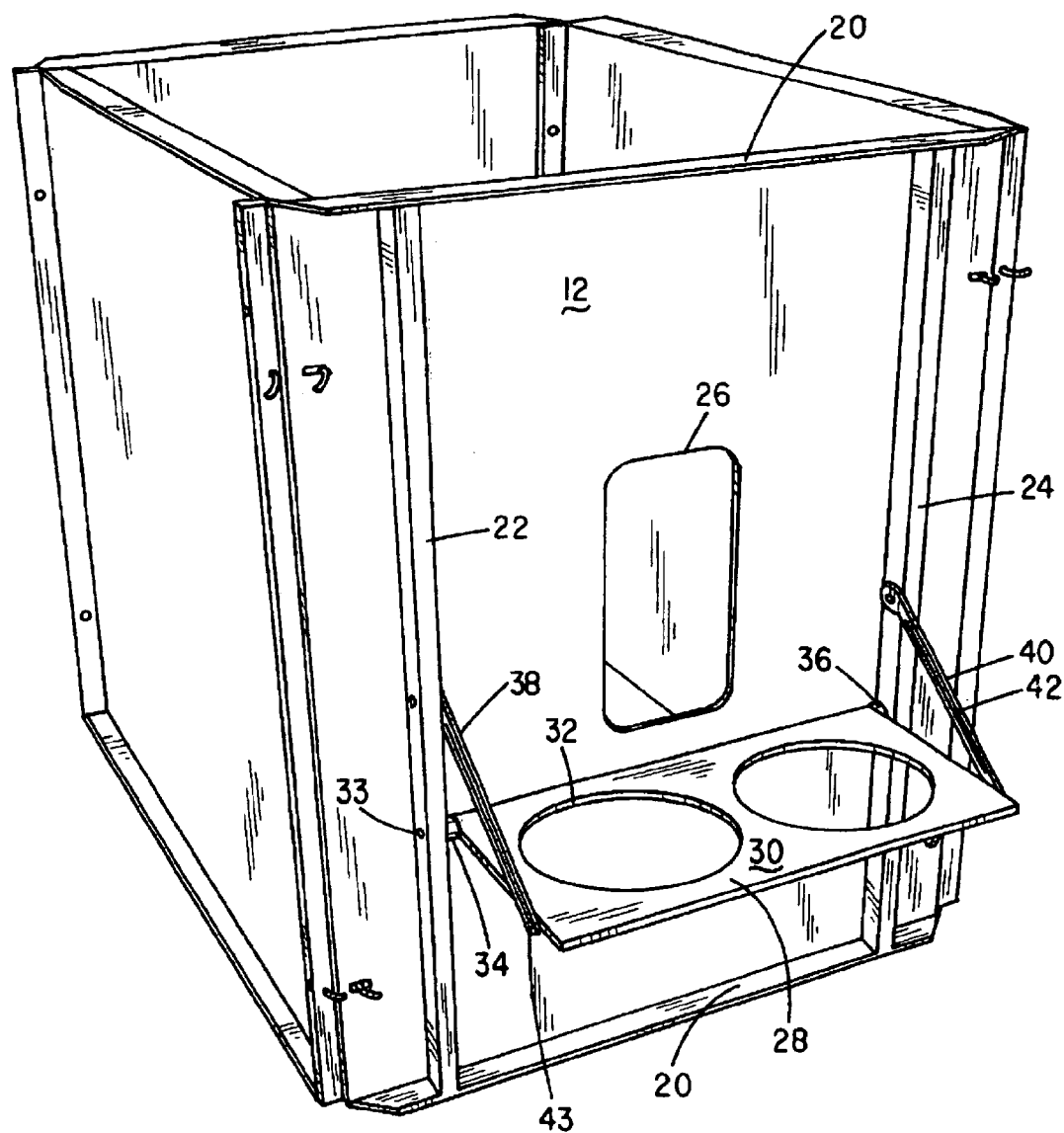
FIG. 2 is a further isometric view showing the pail holder extended.
Figure 6:
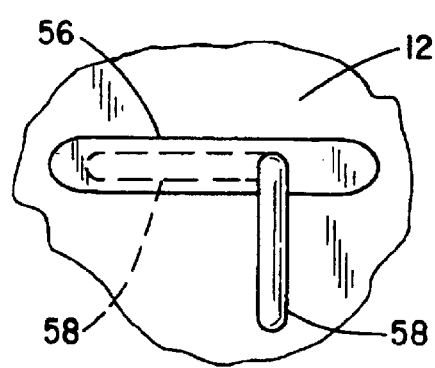
FIG. 6 is a detailed view of the fastener arrangement employed.
Figure 7:
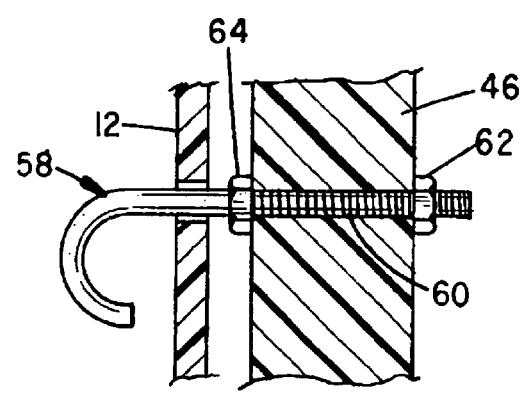
FIG. 7 is a partial cross-sectional view illustrating the preferred panel fastening arrangement.

As can be seen in FIGS. 1 and 2, and in the detailed view of FIG. 6, the front and rear panels 12 and 14 each include first and second elongated apertures, as at 56, formed therethrough at vertically spaced locations that are adjacent opposed vertical edges thereof. Affixed to the innermost reinforcing struts 44 and 46 are J-shaped bolts/fasteners 58 that are designed to fit through the elongated apertures 56 when the J-bolt fastener is in a first orientation but not when in a second orientation. The J-bolt 58 has a threaded shank 60 that extends through the width dimension of the reinforcing strut and is held by a pair of locking nuts 62 and 64 that are threaded onto the shank such that the hook portion of the J-bolt can be rotated from a position in alignment with the elongated aperture 56 (as shown by the dotted lines in FIG. 6) to a position where the hook member is no longer aligned with the aperture. Thus, in assembling a front or rear panel to an associated side panel, the J-bolts involved are turned to their position in alignment with the aperture 56 and the front or rear panel is then slipped onto the J-bolt's hook. Then, when the J-bolt hook is rotated to the position shown in solid line in FIG. 6, the front or rear panel is latched in place. In the case of a J-bolt, gravity tends to orient the J-bolt hook in a vertical plane resisting detachment due to vibration.

Shown in FIG. 3, the shank of the J-bolt fastener extends sufficiently far beyond the forward edge of the reinforcing strut 46 so that the front panel 12 can be swung open without having to detach the front panel completely from one of the side panels. This permits ingress and egress of the animal or a person. Thus, in this instance, the fastening arrangement not only acts as a lock or latch, but also as a hinge.

As can be seen in the view of FIG. 1, the outermost reinforcing struts 48 and 50 also have J-bolts affixed to them such that the side panels 16 and 18 can serve as a common partition between two adjacent box stalls. That is, an additional set of front and rear panels can be connected to the outer reinforcing strut of one side panel by simply inserting the J-bolts on the outer struts through the elongated apertures on the set of front and rear panels to create a contiguous adjacent box stall assembly upon the addition of one further side panel. Of course, still further box stalls can be added in the manner indicated.

The modular panel design employed allows considerable flexibility in assembling confinement pens. For example, a barn's wall can serve as the back panel of the stall by connecting the rear edges of the two side panels 16 and 18 to the barn wall. Similarly, a barn's wall can serve as one side of the stall by removably joining one edge of the front and rear panels to the wall. If desired, the side panels can be made longer and at each end a front panel can be attached. Then, by inserting a rear panel between the two sides midway between the two front panels, two confinement stalls result. Also, in the case of narrow stalls, if it is desired to prevent physical contact between animals in adjacent stalls while still providing a head opening for feeding purposes, the front panels can be positioned rearward of the vertical edges of the two side panels so that the portion of the side panels extending beyond the recessed front panels will block such contact.

Since the J-bolts remain permanently attached to the respective side panels, there is no opportunity for losing screws and bolts as in prior art pen configurations heretofore mentioned. Also, because the panels are generally planar, they can be neatly stacked when not in use.

During use, and as needed, fresh bedding may be added within the calf stall to cover manure and once the calf is weaned, the respective panels can be disassembled leaving the pile of bedding/manure in place for easy removal by a front end loader.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself

What is claimed is:

1. An animal holding pen comprising:
   (a) a front panel, a rear panel and left and right side panels, each of the panels being generally rectangular and of a smooth polymeric material, the front and rear panels each including first and second elongated apertures of a predetermined width formed therethrough at vertically spaced locations adjacent opposed vertical edges thereof, and
   (b) a pair of fasteners affixed to the side panels at vertically spaced locations corresponding to the spacing between said first and second elongated apertures, said fasteners comprising bolts having a shank passing through bores in the side panels and an arcuate portion on the shank adapted to pass through the elongated apertures when the arcuate portion is in a horizontal plane but not when the arcuate portion is in a vertical plane.

2. The animal holding pen as in claim 1 and further including:
   (a) said front panel having an opening sufficiently large to permit a confined animal's head to pass therethrough; and
   (b) a food pail holder affixed to the front panel at a location below said opening.

3. The animal holding pen as in claim 2 when the food pail holder comprises a platform having at least one hole formed therethrough in which a food pail can be inserted and retained.

4. The animal holding pen as in claim 3 wherein the platform is pivotally joined to the front panel to be movable from a position parallel to the front panel to a position perpendicular to the front panel.

5. The animal holding pen as in claim 4 and further including a pair of parallel, spaced-apart vertical ribs affixed to the front panel, the platform being pivotally mounted between the pair of vertical ribs.

6. The animal holding pen as in claim 5 and further including a pair of straps coupled between opposed side edges of the platform and the pair of vertical ribs for limiting the extent that the platform can be moved.

7. The animal holding pen as in claim 1 wherein each of the side panels includes a reinforcing strut disposed along opposed vertical edges thereof with said pair of fasteners being affixed to the reinforcing struts.

8. The animal holding pen as in claim 1 wherein the arcuate portion is J-shaped.

9. The animal holding pen as in claim 8 wherein the shank of the bolts are sufficiently long to permit the front panel to be pivoted relative t a front vertical edge of a side panel to permit entry and exit of a person or animal into and from the holding pen.

10. The animal holding pen as in claim 1 wherein each of the front panel, rear panel and left side panel and right side panel have a reinforcement integrally formed along a top and a bottom edge thereof.

* * * * *